E. S. PHELPS.
VIBRATION RECORDER FOR AUTOMOBILES AND OTHER VEHICLES.
APPLICATION FILED AUG. 24, 1906.
1,001,220.
Patented Aug. 22, 1911.
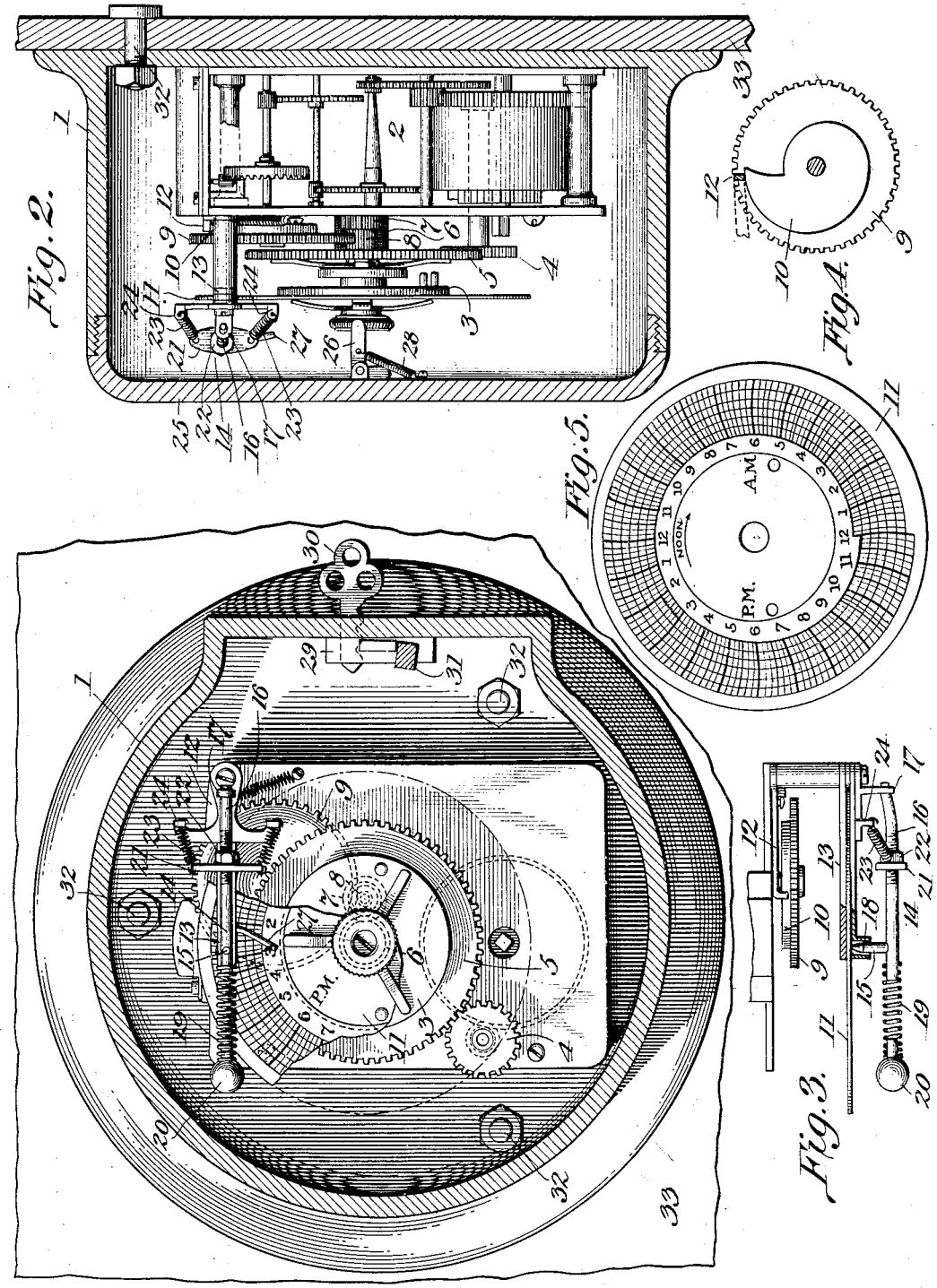

UNITED STATES PATENT OFFICE.

EDWIN SANFORD PHELPS, OF NEW YORK, N. Y.

VIBRATION-RECORDER FOR AUTOMOBILES AND OTHER VEHICLES.

1,001,220.  Specification of Letters Patent.  Patented Aug. 22, 1911.

Application filed August 24, 1906. Serial No. 331,916.

*To all whom it may concern:*

Be it known that I, EDWIN S. PHELPS, a citizen of the United States, residing at New York, in the county of New York and State of New York, have invented certain new and useful Improvements in Vibration-Recorders for Automobiles and other Vehicles; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to a device for automatically recording the running or movements of conveyances or vehicles by actuation of the recording means from vibrations of the conveyance or vehicle during the period it is in use.

The object of the invention is to provide a recording member sensitive to the vibrations of the conveyance or vehicle so as to make the record; also to provide for indicating whether the recording device has been tampered with for the purpose of preventing it making its automatic record; also to provide for making a record of access to the operative parts by unauthorized persons.

The device is specially well adapted for affording the owners of automobiles protection against the unauthorized use of the vehicle, since it will furnish a record indicating the use of the same, and the period of its use, as well as a record of access to the operative parts if such be had at any time. It also affords a removable record dial which need not be examined or replaced by another oftener than once a week unless sooner desired, thus giving to the owner the minimum of labor, time, thought and anxiety, and providing for him at the end of the week a correct record of the running of his automobile during the preceding seven days; and in the meanwhile requiring no attention, and not being subject to or making necessary any act on the part of the chauffeur to make a record of the use or running of the machine.

To the accomplishment of the foregoing and such other objects as may hereinafter appear the invention consists in the features hereinafter particularly described and then sought to be clearly defined by the claims, reference being had to the accompanying drawing forming a part hereof, and in which—

Figure 1 is a front elevation of the recorder with parts broken away; Fig. 2 is a vertical cross section through the casing with its internal mechanism in elevation; Fig. 3 is a detail plan view of parts; Fig. 4 a detail of the snail or cam for moving the vibrating arm, and Fig. 5 a front view of the record-receiving dial, showing at one point the irregular line made by the vibrating marking point.

In the drawing, the numeral 1 designates a casing containing suitable clock mechanism 2 which actuates a dial-plate 3, for instance, through the pinion 4 meshing with a gear wheel 5 and with which turns a pinion 6 from which motion is transmitted through pinions 7 and 8 to a toothed wheel 9 which carries a snail 10. The dial-plate 3 is provided with a dial 11 divided preferably into concentric circles and divisions, representing days of the week and hours and fractions of hours. This dial may be of any suitable material, and of paper having a surface sensitive to a marking point, or not as desired. An arm 12 rests upon the snail 10 and is connected to an arm 13, which preferably is bifurcated to receive the dial 11 between its two members, and it is capable of moving with the arm 12 so that as the latter is moved by the snail a corresponding movement is imparted to the arm 13 across the divisions of the rotating dial.

As no claim is made to the parts so far described and they may be varied without departing from the present invention, a more detailed description thereof is not necessary.

Supported from the arm 13 in any suitable manner so as to vibrate is a vibratory member 14 carrying a marker 15. In the form shown this member consists of an arm 16 loosely mounted at one end in a suitable support 17 so as to be free to move or vibrate under vibrations imparted thereto. The marker 15 carried by this vibratory member passes loosely through a collar 18 on the arm 13 and has its point against or in proximity to the face of the dial 11 so that when vibrated with the vibratory member it will mark the face of the dial. The member 14 carries a spring 19, preferably a coiled spring, which is sensitive to vibrations, and has at its end a weight 20. Vibrations of the weight derived from vibrations of the conveyance or vehicle to which the device will be attached will be transmitted through the spring to the vibratory member 14 and its marker so that the latter will mark the dial face during the travel or movement of the conveyance or body to which the device is attached. This makes a very sensitive vibratory member, as the spring is capable of vibrating in a vertical as well as a horizontal plane or in planes at an angle to each other. Under some conditions it is desirable to have the vibratory member carrying the marker require a stronger vibration to move it than under other conditions. With the view of adjusting the vibrator to such different conditions, the member 14 is provided with an adjustable member, which for convenience will be termed a saddle 21 which saddle may be moved along the vibratory member by a nut 22 engaging screw threads on the vibratory member. This saddle is connected by springs 23 to a suitable part, for instance to a bracket 24, which springs will be put under tension when the adjusting nut and saddle are moved toward the free end of the vibratory member. This will put the vibratory member under tension so that a stronger vibration will be required to move it than when the tension on it is less.

The casing 1 which contains the parts described is provided with a closure which in the form shown is a screw cap 25, made to fit water-tight to the casing. This cap carries a tripper 26 so located with relation to a pin 27 projecting from the vibratory member 14 that when the cap is turned in the direction to unscrew it, the tripper will contact with the pin 27 and move the vibrating member and its marker across the face of the dial, and thus make a mark on the dial which will be distinctive from the markings due to the vibrations of the marker, and thus indicate that access has been had or attempted to be had, to the operative parts of the device. Thus if any attempt be made to tamper with the recording mechanism indictation thereof will be made on the dial. This marking of the dial whether from the vibrations or from having or attempting to have access to the operative parts, is important whether the markings be made by perforations from the point of the marker, or otherwise from the character of the marker employed. Under the particular means shown when the tripper acts on the finger of the vibrator it pushes the marker and the arm through which it works, toward and beyond the edge of the disk, and as the point of the marker will pass across the space between the two members of the arm 13, the pin will rest against the peripheral edge of the dial and thus prevent the parts from assuming their normal position until readjusted. This will insure an additional indication that the device has been tampered with. However the throw of the tripper and pin may be less than to move the marker to the extreme edge of the dial, and yet the distinctive marking indicating tampering with the device will be made. While the tripper will thus move the marker in opening the cap, yet it will not so move it in screwing the cap into place because it will yield or give in passing over the pin so as not to move the marker. The tripper is provided with a spring 28 to restore it to its normal position after passing the pin in screwing the cap.

To guard against the closure or cap being opened without the use of a key, a lock 29 is provided. As illustrated it is attached to the casing 1 and preferably is of the Yale type and operated by a flat key 30. A lug or block 31 is attached to the screw cap or cover in such position as to lie against the bolt when thrown into locking position and thereby prevent the cap from being unscrewed.

The casing and its inclosed parts will be attached by a bolt or bolts 32 to the dashboard represented by 33 of the motor vehicle, or to other suitable part of the body to which it is attached.

Under the construction described the dial is continuously moved by the time clock mechanism and the marker moved the distance of one space between the concentric lines in each revolution of the dial by reason of the snail cam acting on the arm resting thereon, and as there are seven concentric lines the dial serves for a whole week. Inasmuch as the casing is attached to the vehicle or moving body, so long as the body is in motion the vibration resulting from its movement is imparted to the weighted spring and through it to the vibratory member and marker and the latter caused to make a record upon the dial, while no record will be made while the vehicle or body is not in motion. An inspection of the dial will consequently show the periods during which the machine was in use, and the concentric lines and divisions of the dial will indicate the days of the week and the hours and fractions thereof, day or night, during which the machine was used. The owner of the machine or vehicle is thus kept advised of the use of his machine. If an attempt is made to tamper with the record, he is also advised of that fact by the marking made on opening the cap or cover, and is also advised whether a duplicate key has been obtained and used because the cover is locked and can only be opened by a duplicate key. Various checks are therefore placed upon the unauthorized use of the machine, and the owner enabled to take steps to stop such unauthorized use.

It will be observed that the collar through which the marker plays serves to restrict the lateral vibrations of the marker so that its markings will be on or adjacent to concentric lines of the record-receiving means or dial opposite to which for the time being the marker is operating; otherwise the markings would be carried beyond such lines and the particular day of the week on which the markings were made would not be so readily ascertainable. It will further be observed that if the marker be so set by proper adjustment of the tension regulating spring, that its point will be normally out of contact with the record-receiving member, when the vehicle is not in motion no mark will be made upon the dial which will be continuously moved whether the vehicle is in motion or not. In such case no marking will be made upon the dial as illustrated except when the vehicle is in motion, at which time the vibrations will cause the marker to move to and from the dial so as to make a mark or record when it contacts with the dial. But the marker may be adjusted or placed so as to be normally in contact with the dial, and in such case the marking on the dial would occur when the vehicle was not in motion as well as when in motion, but when in motion the marking would be different from that when not in motion owing to the vibration of the marker while the vehicle is in motion. In either case the lateral vibration of the marker will be restricted to within prescribed limits by the collar through which it operates for the reason already stated. It will be perceived that the marker has a vibration to and from the face of the dial as well as parallel therewith, so that whether in continuous or intermittent contact with the record-receiving member it makes a record thereon. It will be further observed that the vibration derived by the spring from the motion of the vehicle is transmitted from the spring to the marker, and that the resiliency of the spring multiplies the vibrations so that the vibrations derived by the marker are more numerous, and the marker made tremulous in character and more sensitive in action.

It will be observed that while the marker has a movement parallel with the dial or record-receiving member yet said movement is restricted by the opening through which the marking point 15 operates so that its vibrations will be confined within the convolute area representing the particular day the record is made, thus preventing the record of one day encroaching upon the record of another day, or in other words preventing overlapping of the records. When the vehicle is at rest the marker will make a continuous or unbroken line and when the vehicle is in motion the marker will make a transverse line, thus giving to each convolution differentiating characteristics between motion and rest.

I have illustrated and described the preferred details of construction and arrangement but without any intention of limiting the invention thereto, as the invention is more comprehensive as endeavored to be made clear by the scope of the appended claims.

The movement is not confined to being either permanently attached or slidably removable from its casing for purposes of winding and for changing the dials, but as these are features not involving invention and merely suggestive of what may be done, no detailed illustration is necessary.

Having described my invention and set forth its merits, what I claim is:—

1. In a vibration recorder, a vibratable marker capable of vibration in relation to a record-receiving member, and a weighted vibratable spring, capable of vibrating in planes at an angle to each other, connected with said marker for transmitting vibrations thereto, substantially as described.

2. In a vibration recorder, a vibratable marker capable of vibration in relation to a record-receiving member, and a vibratable spring capable of vibrating in planes at an angle to each other for receiving and transmitting vibrations to said marker, substantially as described.

3. In a vibration recorder, a marker capable of free vibration parallel with the face of a record-receiving member, and means for regulating the resistance of said marker in relation to the force of vibration to move it, substantially as described.

4. In a vibration recorder, a vibratable member, a marker carried by said member and vibratable therewith in relation to a record-receiving member, a vibratable spring carried by said member for transmitting vibrations to said member and marker, and a weight carried by said spring, substantially as described.

5. In a vibration recorder, a vibratable member carrying a marker vibratable in relation to a record-receiving member, a spring connected with said member, and means for adjusting the tension of said spring to regulate the resistance which said member shall offer to the force of vibration to move it, substantially as described.

6. In a vibration recorder, a vibratable member carrying a marker vibratable in relation to a record-receiving member, a part movable lengthwise on said vibratable member, a spring connected with said part, and means for adjusting said part on the member to vary the tension of the spring to regulate the resistance which said member shall offer to the force of vibration to move it, substantially as described.

7. In a vibration recorder, a vibratable marker capable of free vibration parallel with the face of a record-receiving member responsively to vibrations derived from a moving body, a casing inclosing the member and marker, a closure or cap to the casing, and means actuated from the closure or cap to make a record of the movement of the cap or closure, substantially as described.

8. In a vibration recorder, a vibratable marker capable of free vibration parallel with the face of a record-receiving member, a casing inclosing said member and marker, a closure or cap to the casing, a lock for the closure or cap, and means actuated from the closure or cap to make a record of the movement of the cap or closure, substantially as described.

9. In a vibration recorder, a casing inclosing a record-receiving member and marker therefor, a screw cap to the casing, and a lock and a stop or lug for the lock-bolt to engage with, one being attached to the casing and the other to the screw cap, substantially as described.

In testimony whereof I affix my signature in presence of two witnesses.

EDWIN SANFORD PHELPS.

Witnesses:
P. OETJEN,
LAURA E. SMITH.